April 27, 1954 W. H. PFARRER 2,676,609
FLUID PRESSURE OPERATED WEAR RESISTANT SLURRY VALVE
Filed Sept. 4, 1948 2 Sheets-Sheet 1

INVENTOR
William H. Pfarrer
BY Pope + Pope
ATTORNEYS.

April 27, 1954   W. H. PFARRER   2,676,609
FLUID PRESSURE OPERATED WEAR RESISTANT SLURRY VALVE
Filed Sept. 4, 1948   2 Sheets-Sheet 2
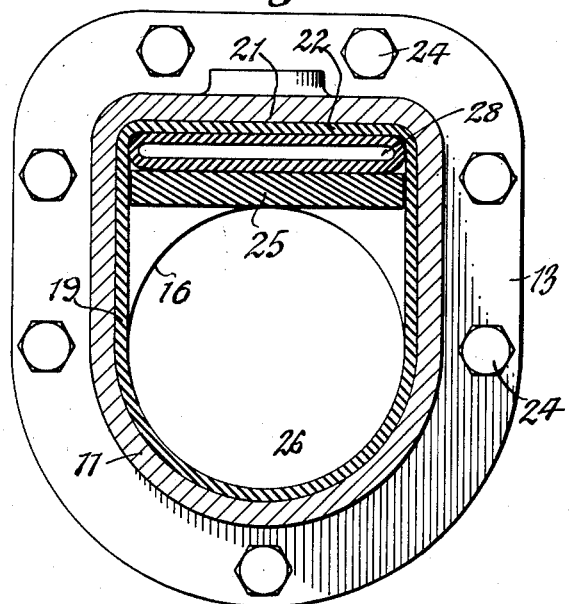
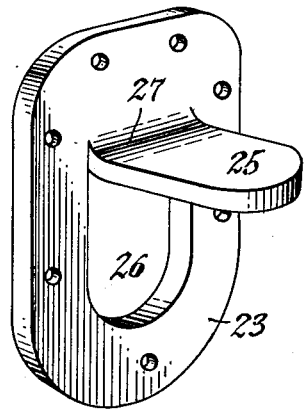
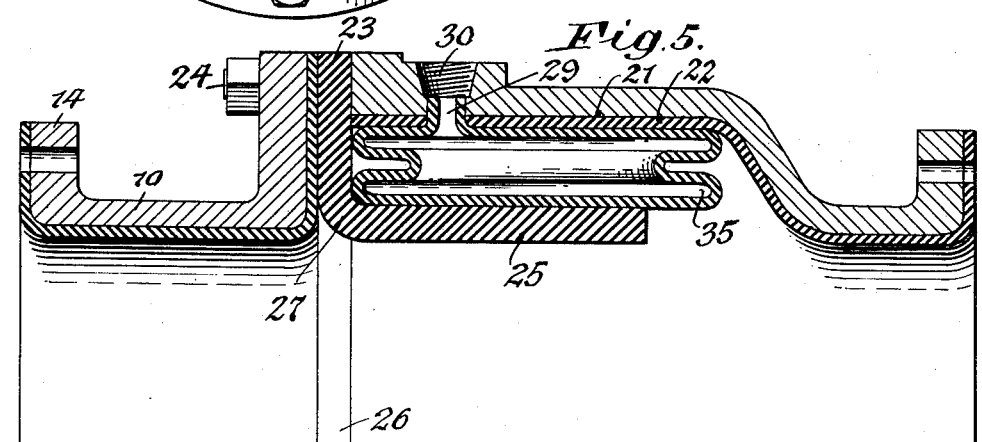
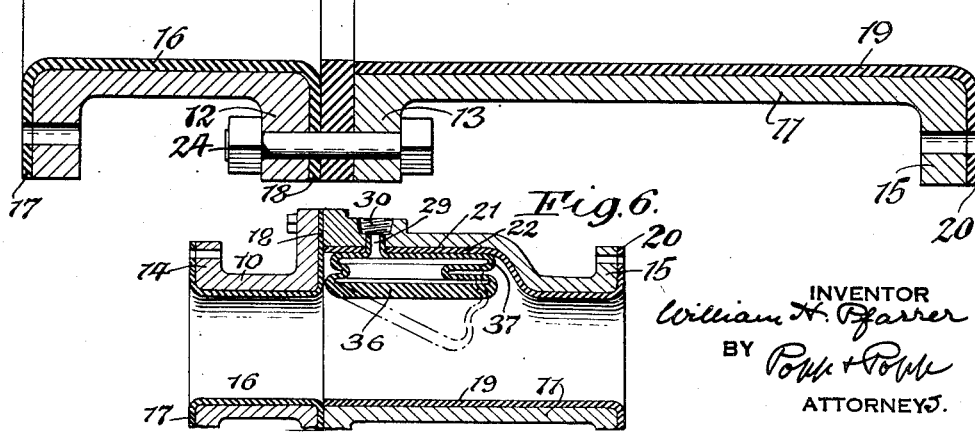
INVENTOR
William H. Pfarrer
BY Pope + Pope
ATTORNEYS.

Patented Apr. 27, 1954

2,676,609

UNITED STATES PATENT OFFICE 2,676,609

FLUID PRESSURE OPERATED WEAR RESISTANT SLURRY VALVE

William H. Pfarrer, Evanston, Ill., assignor to Morris Machine Works, Baldwinsville, N. Y., a corporation of New York Application September 4, 1948, Serial No. 47,931

3 Claims. (Cl. 137—375)

1

This invention relates to a throttle valve whereby the flow of a liquid through a conduit may be regulated, and more particularly to a valve of this character which is designed primarily to withstand the abrasive action of slurries and other liquids containing solids and water. As is well known, liquids or slurries containing abrasive ingredients cause the surfaces of the conduits of valves made wholly of metal or the like to wear very rapidly and it has therefore been proposed to line the conduits of valves and cover the closure members whereby the flow of this liquid mixture is controlled with rubber or a similar resilient material which is wear-resistant, thereby prolonging the life of the valve.

One of the objects of this invention is to provide a throttle valve for use in controlling the flow of slurries or the like in which the surfaces contacted by the slurries are covered with rubber or similar resilient material which is resistant to wear by abrasives and which is so organized that the closure or throttle member may be actuated pneumatically.

A further object of this invention is to provide a valve of this character which permits of readily utilizing either the full pipe line capacity or to restrict the same as much as required and to accomplish this by means which are comparatively simple in construction and capable of being readily assembled and disassembled when manufacturing, inspecting and repairing the same.

In the accompanying drawings:

Fig. 3 is a cross section taken on line 3—3, Fig. 1.

Fig. 4 is a perspective view of the throttle plate or closure member and the means for mounting the same on the body of the valve in accordance with the form of this invention shown in Figs. 1–3.

Fig. 5 is a longitudinal section, similar to Fig. 1, but showing a modified form of the deflatable member whereby the throttle plate or closure is actuated.

Fig. 6 is a similar view showing another modified form of this invention in which the throttle plate or closure member is formed integrally with the inflatable member which actuates this plate.

In the following description, similar characters of reference indicate like parts in the several figures of the drawings.

Figure 1:
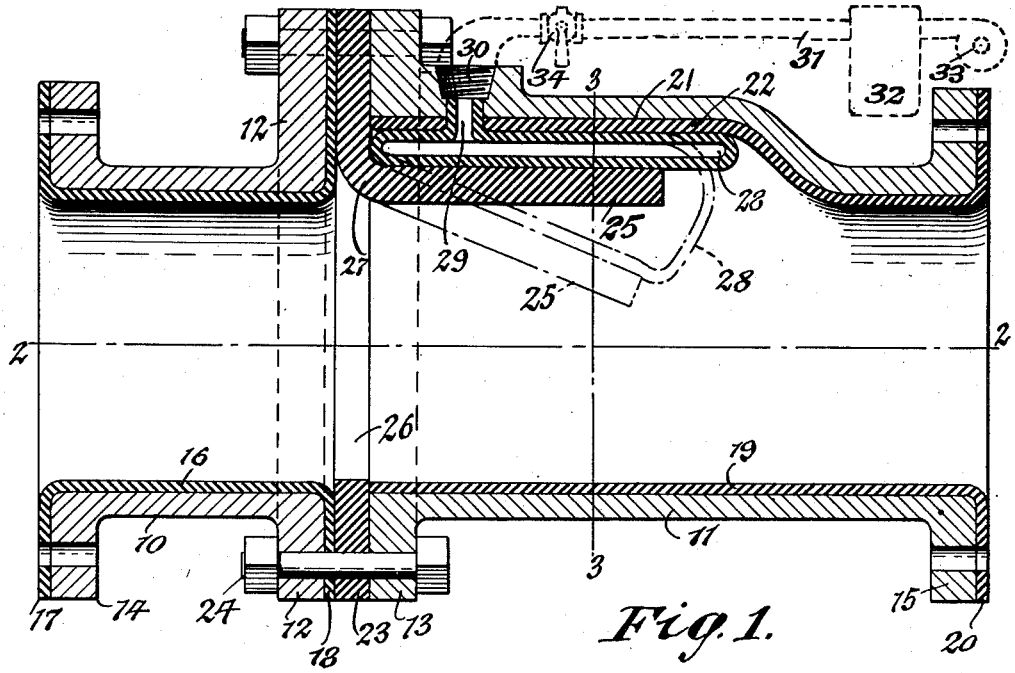
Fig. 1 is a longitudinal section of a throttle valve embodying one form of this invention.
Figure 2:
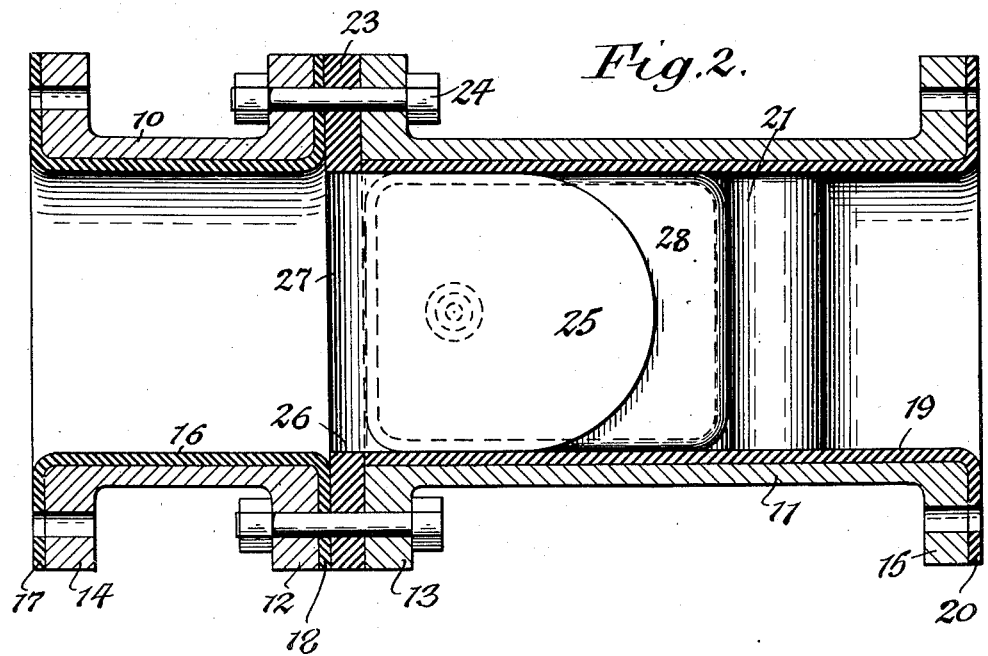
Fig. 2 is a longitudinal section taken on line 2—2, Fig. 1, looking toward the throttle member or closure of this valve.

The body of the throttle valve shown in Figs. 1 and 2 comprises a tubular inlet section 10 and a tubular outlet section 11 arranged axially in line and provided, respectively, on the exterior of their opposing ends with laterally projecting coupling flanges 12, 13 forming part of the means for connecting these two sections. The outer end of the inlet section is provided with a laterally projecting coupling flange 14 and the outer end of the outlet section is provided with a laterally projecting flange 15 which flanges form part of the means whereby the valve body sections are respectively connected with the up-stream and the down-stream parts of the pipe line.

The internal surfaces of these body sections are lined or covered with rubber or other resilient material which resists the wearing action of any solid material contained in the slurry or a like liquid which has an abrasive effect. The tubular linings are held in place by providing the same with parts which are clamped between the opposing ends of the body sections and also with parts which are clamped between the outer extremities of these sections and the piping with which the same are connected. For this purpose a protecting tube 16 of rubber or the like is secured in the bore of the tubular inlet section 10 of the body and provided at its outer end with a laterally projecting gasket flange 17 engaging with the face of the outer coupling flange 14 and the inner end of this protecting tube is provided with a laterally projecting gasket flange 18 which engages with the inner face of the inner coupling flange 12.

A similar protecting tube 19 of rubber or the like is secured to the bore of the tubular outlet section 11 of the valve body and terminates at its inner end flush with the face of the coupling flange 13, while its outer end is provided with a laterally projecting gasket flange 20 of like material engaging with the face of the outer coupling flange 15.

On one side of the bore of the body outlet section and extending forwardly from the inner end of the same, a pocket 21 is formed which terminates short of the coupling flange 15 at the outer end of this body section. That part 22 of the resilient lining within the pocket is also deflected laterally so that the same has the general shape of this pocket and engages with the inner surface thereof.

The numeral 23 represents a supporting frame of rubber or similar resilient material which is resistant to abrasion upon being engaged by liquid or slurries containing abrasive material. This supporting frame has its margin arranged between the inner coupling flange 13 of the body outlet section and the inner gasket flange 18 of the inlet protecting tube 16. This inner gasket flange and the supporting frame 23 are pressed against each other and against the respective coupling flanges 12, 13 by means of bolts 24 passing through these several members and thereby not only supporting the protecting tube 16 and this supporting frame on the body of the valve but also forming a liquid tight joint between these body members. The outer coupling flanges 14, 15 of the inlet and outlet body sections and the gasket flanges 17, 20 on the outer ends of the protecting tubes are respectively connected by bolts or the like with cooperating sections of the pipe line in which this valve is installed.

Within the outlet section of the tubular valve body and opposite the pocket 21 thereof a throttle member 25 of rubber or similar resilient material and having the form of a plate or flap is arranged lengthwise, which member is adapted to move crosswise of the valve body for the purpose of regulating the amount of fluid passing through the valve. Upon moving this throttle plate laterally outward so that the same is wholly within the pocket 21 of the body outlet section, as shown by full lines in Figs. 1 and 3, the conduit through the valve body is wholly unobstructed and fluid of the greatest amount is capable of flowing through the valve. Upon moving this valve plate inwardly so that the same crosses the stream of fluid, as shown by dotted lines in Fig. 1, the capacity of the conduit through the valve body is restricted. Upon movement of the valve plate a greater or lesser extent across the conduit in the valve body this will throttle the flow of liquid therethrough accordingly. This throttle plate is connected at its rear end to the supporting frame 23 on one side of a port 26 arranged in the central part of this frame and establishing communicating between the inlet and outlet sections of the valve body. The throttle plate is preferably formed integrally with the sheet of rubber or like resilient material from which the supporting frame 23 is produced, this being accomplished by punching a hole in the central part of this sheet in order to produce the port 26 therein leaving one end of the displaced material forming the throttle plate 26 attached to a part of this sheet on one side of this port and thus provide a hinge or pivotal connection 27 between this throttle plate and the supporting frame 23 by means of which the throttle plate can be turned either into its fully retracted position within the pocket of the valve body, as shown in Figs. 1 and 3, or may be shifted inwardly into a position more or less across the conduit of the valve body, as shown by dotted lines in Fig. 1.

The pressure of the fluid through the valve body and against the throttle plate tends to move the latter into its open position, but if desired the supporting frame and the throttle plate may be molded of rubber or similar resilient material so that the throttle plate normally projects at right angles from the supporting frame, as shown in Fig. 4, so that the resilience of the throttle plate will maintain the same in a position in which it is arranged in the pocket of the valve body and lengthwise of the conduit therein.

Various means may be employed for moving the throttle plate from its retracted position within the pocket of the valve body into a position in which it projects across the conduit in the valve body and cuts down the flow or liquid through the same accordingly. Fluid actuated means are provided for this purpose which can be controlled either immediately adjacent to the throttle valve or at a distance therefrom depending upon the requirements of the particular installation.

As shown in Figs. 1 and 3, this is accomplished by means of a fluid expansible or air inflatable member 28 having the form of a bulb which is made of rubber and mounted on the valve body within the pocket 21 in the body outlet section and on the outer side of the throttle plate 25. This bulb is provided on its outer side with a laterally projecting nipple 29 secured in an air or fluid supply opening 30 formed in the adjacent part of the body outlet section, which opening is connected by a pipe 31 or other suitable means with a source of compressed air so that upon admitting air to the bulb 28, the latter will expand and shift the throttle plate 25 inwardly across the conduit within the valve body, but when the compressed air is permitted to escape from the bulb the latter will collapse into a flattened condition, as shown in Figs. 1 and 2, and thereby permit the throttle plate to assume its retracted or inoperative position either by resilience of the throttle plate or the pressure of the flowing liquid against the same.

Although the operating fluid or compressed air may be supplied to the bulb or similar inflatable or expansible member and withdrawn therefrom in any suitable manner, this may be accomplished by the means which are diagrammatically represented in connection with Fig. 1 and which consists generally of a compressed air storage tank 32 which is connected with the supply pipe 31 and in which air is compressed by means of a blower 33 and a three-way valve 34 arranged in the pipe 31 and adapted to either connect the inflatable member 28 with the compressed air tank for the purpose of inflating this member and moving the throttle plate across the conduit in the valve body, or connecting this bulb with the atmosphere and cutting the same off from this bulb so that the pneumatic member will be deflated.

Instead of constructing the pneumatic inflatable member in the form of a bulb, as shown in Figs. 1 and 3, this inflatable member may be constructed in the form of a bellows 35, as shown in Fig. 5, in which case the bellows is also preferably made of rubber or other resilient material which is resistant to wear by engagement therewith of abrasive material.

Upon admitting air into the bellosw shaped inflatable member the same will move the throttle plate from its retracted position, shown in Fig. 5, to a more or less projected position across the path of the fluid through the conduit in the valve body and upon withdrawing the compressed air from this bellows the throttle plate may be again returned to its retracted position within the pocket of the valve body so as to obtain the full flow capacity of the pipe line.

As shown in Figs. 1, 2, 3, 4 and 5, the throttle valve is formed integrally with a supporting frame 23 which is clamped between the opposing ends of the tubular body sections, but if desired this valve plate may be attached to or formed integrally with the inflatable member. An example of the last mentioned form of this invention is shown in Fig. 6, in which the inner part 36 of the inflatable bellows is made considerably thicker than the foldable inner corrugations 37 thereof so that this inner thicker part is integral with the bellows and forms the throttle plate or member. Upon inflating the bellows 37 with compressed air the throttle plate 36 will be moved more or less across the stream of fluid passing through the conduit in the throttle valve, while upon exhausting the air from this bellows the throttle plate or member 36 will be retracted into the pocket 21 of the outlet body section and thus leave the conduit through the valve wholly unobstructed and permit of utilizing the full capacity of the pipe line.

In the foregoing description compressed air is particularly mentioned as the fluid medium for inflating the member 28 but it is to be understood that any other suitable fluid such as a liquid under pressure may be employed for expanding this member and moving the throttle plate 25.

Owing to the simplicity of the construction of this throttle valve the same can be produced at low cost and as a whole the same comprises but few parts which are very durable and not liable to get out of order, thereby materially reducing maintenance costs.

I claim as my invention:

1. A throttle valve, comprising a tubular body having an inlet section and an outlet section, a supporting frame of resilient material secured between the opposing ends of said body sections and provided with a port, a throttle plate of resilient material for said port and integrally connected at one end with said resilient frame at an edge portion of said port and arranged lengthwise in said outlet section when said port is fully opened, a fluid expansible member of resilient material arranged between said throttle plate and said body and adapted to move said throttle plate crosswise in said body to vary the effective opening of said port, and a port through the wall of said body in communication with the interior of said expansible member.

2. A throttle valve, comprising a hollow body having a tubular inlet section and a tubular outlet section, the opposing ends of said sections being provided with external coupling flanges and said outlet section being provided on one side of its interior with a pocket, a resilient protecting tube lining the inner wall of said inlet section and provided with a resilent gasket flange at its inner end extending across the face of the respective coupling flange, a resilient protecting tube lining the inner wall of said outlet section and its pocket and having its inner end terminating flush with the inner face of the respective coupling flange, a supporting frame of resilient material secured between the gasket flange of the inlet protecting tube and the coupling flange of the outlet body section and provided in its central part with a port, a throttle plate of resilient material for said port arranged lengthwise in said outlet section opposite the pocket therein when open and integrally connected at one end with said resilient frame at an edge portion of said port, a fluid expansible flexible member which is arranged between said throttle plate and the adjacent part of the resilient tube in said pocket, and a port through the wall of the pocket in communication with the interior of said expansible member.

3. A throttle valve, comprising a hollow body having a tubular inlet section and a tubular outlet section, the opposing ends of said sections being provided with external coupling flanges and said outlet section being provided on one side of its interior with a pocket, a resilient protecting tube lining the inner wall of said inlet section and provided with a resilient gasket flange at its inner end arranged between said coupling flanges, a resilient protecting tube lining the inner wall of said outlet section and its pocket, a throttle plate of resilient material arranged lengthwise in said outlet section transversely in line with said pocket when said valve is fully open, and a fluid expansible bellows arranged in the pocket of said outlet section and having its inner wall formed by said throttle plate, and a port through the wall of the pocket in communication with the interior of said bellows.

References Cited in the file of this patent

UNITED STATES PATENTS

| Number | Name | Date |
|---|---|---|
| Re. 19,151 | Saunders | May 1, 1934 |
| 378,600 | Lenhart | Feb. 28, 1888 |
| 615,717 | Knapp | Dec. 13, 1898 |
| 1,779,503 | Swindin | Oct. 28, 1930 |
| 1,923,306 | Hagen | Aug. 22, 1933 |
| 2,025,665 | Dickinson | Dec. 24, 1935 |
| 2,188,216 | Beecher | Jan. 23, 1940 |
| 2,256,467 | Hoof | Sept. 23, 1941 |
| 2,263,462 | Hunter | Nov. 18, 1941 |